(12) United States Patent
Dufour et al.

(10) Patent No.: US 11,649,382 B2
(45) Date of Patent: *May 16, 2023

(54) BIODEGRADABLE CELLULOSE FIBER-BASED SUBSTRATE, ITS MANUFACTURING PROCESS, AND USE IN AN ADHESIVE TAPE

(71) Applicant: Ahlstrom Oyj, Helsinki (FI)

(72) Inventors: Menno Dufour, Lyons (FR); Violaine Durand, Ampuis (FR)

(73) Assignee: Ahlstrom Oyj, Helsinki (FI)

( * ) Notice: Subject to any disclaimer, the term of this patent is extended or adjusted under 35 U.S.C. 154(b) by 0 days.

This patent is subject to a terminal disclaimer.

(21) Appl. No.: 16/895,316

(22) Filed: Jun. 8, 2020

(65) Prior Publication Data

US 2020/0299550 A1 Sep. 24, 2020

Related U.S. Application Data

(63) Continuation-in-part of application No. 15/514,214, filed as application No. PCT/EP2015/072140 on Sep. 25, 2015, now Pat. No. 10,676,592.

(30) Foreign Application Priority Data

Sep. 26, 2014 (FR) ...................................... 1459114

(51) Int. Cl.
 *B32B 27/12* (2006.01)
 *B32B 7/06* (2019.01)
 (Continued)

(52) U.S. Cl.
 CPC ............... *C09J 7/401* (2018.01); *C09J 7/201* (2018.01); *C09J 7/21* (2018.01); *C09J 7/38* (2018.01);
 (Continued)

(58) Field of Classification Search
 None
 See application file for complete search history.

(56) References Cited

U.S. PATENT DOCUMENTS 3,130,118 A 4/1964 Chapman
3,298,987 A 1/1967 Colgan et al.
(Continued)

FOREIGN PATENT DOCUMENTS

CN 101472954 A 7/2009
CN 202412832 U 9/2012
(Continued)

OTHER PUBLICATIONS

"Vincotte—Requirements of the EN 13432 Standard" (undated).*
"Concise Guide to Compostable Products and Packaging" (2011) (Year: 2011).*

*Primary Examiner* — Vivian Chen
(74) *Attorney, Agent, or Firm* — Laine IP Oy

(57) ABSTRACT

A biodegradable cellulose fiber-based substrate, at least one side of which is coated with a release coating including: a) at least one water-soluble polymer (WSP) containing hydroxyl groups, and b) at least one lactone substituted with at least one linear or branched and/or cyclic $C_8$-$C_{30}$ hydrocarbon chain which may contain heteroatoms. The biodegradable substrate is certified biodegradable in accordance with EN 13432. A method of production thereof is also disclosed.

11 Claims, 1 Drawing Sheet

(51) Int. Cl.

| | | |
|---|---|---|
| B32B 23/02 | (2006.01) | |
| B32B 27/06 | (2006.01) | |
| B32B 27/30 | (2006.01) | |
| D21H 27/00 | (2006.01) | |
| B32B 29/00 | (2006.01) | |
| B32B 27/28 | (2006.01) | |
| B32B 7/00 | (2019.01) | |
| B32B 5/02 | (2006.01) | |
| B32B 27/26 | (2006.01) | |
| B32B 5/00 | (2006.01) | |
| B32B 23/00 | (2006.01) | |
| C09J 7/29 | (2018.01) | |
| B32B 29/02 | (2006.01) | |
| B32B 9/06 | (2006.01) | |
| B32B 27/08 | (2006.01) | |
| B32B 23/06 | (2006.01) | |
| B32B 9/04 | (2006.01) | |
| B32B 7/12 | (2006.01) | |
| B32B 23/14 | (2006.01) | |
| B32B 27/10 | (2006.01) | |
| B32B 9/02 | (2006.01) | |
| B32B 23/16 | (2006.01) | |
| B32B 27/18 | (2006.01) | |
| B32B 23/04 | (2006.01) | |
| B32B 23/08 | (2006.01) | |
| B05D 5/08 | (2006.01) | |
| B05D 3/02 | (2006.01) | |
| B05D 5/10 | (2006.01) | |
| C09J 7/20 | (2018.01) | |
| C09J 7/40 | (2018.01) | |
| C09J 7/21 | (2018.01) | |
| C09D 129/02 | (2006.01) | |
| C09D 103/04 | (2006.01) | |
| C09D 103/08 | (2006.01) | |
| C09D 103/10 | (2006.01) | |
| C09D 101/02 | (2006.01) | |
| C09D 103/02 | (2006.01) | |
| C09D 127/06 | (2006.01) | |
| C09D 131/04 | (2006.01) | |
| C09D 103/06 | (2006.01) | |
| C08L 1/02 | (2006.01) | |
| C08L 3/06 | (2006.01) | |
| C08L 31/04 | (2006.01) | |
| C08L 27/06 | (2006.01) | |
| C08L 29/02 | (2006.01) | |
| C08L 3/02 | (2006.01) | |
| C08L 3/04 | (2006.01) | |
| C08L 3/08 | (2006.01) | |
| C08L 3/10 | (2006.01) | |
| C09J 11/06 | (2006.01) | |
| C09J 7/38 | (2018.01) | |
| C08K 5/1525 | (2006.01) | |

(52) U.S. Cl.
CPC ........ *C09J 11/06* (2013.01); *B05D 3/02* (2013.01); *B05D 3/0254* (2013.01); *B05D 5/08* (2013.01); *B05D 5/10* (2013.01); *B05D 2203/20* (2013.01); *B32B 5/00* (2013.01); *B32B 5/02* (2013.01); *B32B 5/022* (2013.01); *B32B 7/00* (2013.01); *B32B 7/06* (2013.01); *B32B 7/12* (2013.01); *B32B 9/02* (2013.01); *B32B 9/04* (2013.01); *B32B 9/06* (2013.01); *B32B 23/00* (2013.01); *B32B 23/02* (2013.01); *B32B 23/04* (2013.01); *B32B 23/06* (2013.01); *B32B 23/08* (2013.01); *B32B 23/14* (2013.01); *B32B 23/16* (2013.01); *B32B 27/06* (2013.01); *B32B 27/08* (2013.01); *B32B 27/10* (2013.01); *B32B 27/12* (2013.01); *B32B 27/18* (2013.01); *B32B 27/26* (2013.01); *B32B 27/28* (2013.01); *B32B 27/30* (2013.01); *B32B 27/306* (2013.01); *B32B 29/00* (2013.01); *B32B 29/002* (2013.01); *B32B 29/02* (2013.01); *B32B 2250/03* (2013.01); *B32B 2255/00* (2013.01); *B32B 2255/02* (2013.01); *B32B 2255/12* (2013.01); *B32B 2255/26* (2013.01); *B32B 2262/00* (2013.01); *B32B 2262/04* (2013.01); *B32B 2262/062* (2013.01); *B32B 2307/718* (2013.01); *B32B 2307/748* (2013.01); *B32B 2317/12* (2013.01); *B32B 2317/18* (2013.01); *B32B 2317/20* (2013.01); *B32B 2329/00* (2013.01); *B32B 2329/04* (2013.01); *B32B 2331/00* (2013.01); *B32B 2331/04* (2013.01); *B32B 2405/00* (2013.01); *C08K 5/1525* (2013.01); *C08L 1/02* (2013.01); *C08L 3/02* (2013.01); *C08L 3/04* (2013.01); *C08L 3/06* (2013.01); *C08L 3/08* (2013.01); *C08L 3/10* (2013.01); *C08L 27/06* (2013.01); *C08L 29/02* (2013.01); *C08L 31/04* (2013.01); *C09D 101/02* (2013.01); *C09D 103/02* (2013.01); *C09D 103/04* (2013.01); *C09D 103/06* (2013.01); *C09D 103/08* (2013.01); *C09D 103/10* (2013.01); *C09D 127/06* (2013.01); *C09D 129/02* (2013.01); *C09D 131/04* (2013.01); *C09J 7/20* (2018.01); *C09J 7/29* (2018.01); *C09J 7/40* (2018.01); *C09J 7/405* (2018.01); *C09J 2203/31* (2013.01); *C09J 2400/283* (2013.01); *C09J 2403/005* (2013.01); *C09J 2429/005* (2013.01); *C09J 2467/006* (2013.01); *D21H 27/00* (2013.01); *Y10T 428/14* (2015.01); *Y10T 428/1476* (2015.01); *Y10T 428/27* (2015.01); *Y10T 428/273* (2015.01); *Y10T 428/277* (2015.01); *Y10T 428/28* (2015.01); *Y10T 428/2839* (2015.01); *Y10T 428/31888* (2015.04); *Y10T 428/31895* (2015.04); *Y10T 428/31906* (2015.04); *Y10T 428/31935* (2015.04); *Y10T 428/31971* (2015.04); *Y10T 428/31975* (2015.04); *Y10T 428/31978* (2015.04); *Y10T 428/31982* (2015.04); *Y10T 428/31993* (2015.04)

(56) References Cited

U.S. PATENT DOCUMENTS

| | | | |
|---|---|---|---|
| 4,056,661 A | | 11/1977 | Sato Yo et al. |
| 4,170,672 A | | 10/1979 | Moriya et al. |
| 4,302,367 A | | 11/1981 | Cordes et al. |
| 4,337,862 A | | 7/1982 | Suter |
| 4,405,408 A | | 9/1983 | Yoshioka et al. |
| 4,423,095 A | * | 12/1983 | Blizzard .............. C08L 83/04 427/372.2 |
| 4,624,985 A | | 11/1986 | Tsutsumi et al. |
| 4,654,386 A | * | 3/1987 | Hara .................. C08F 8/00 524/556 |
| 5,013,775 A | | 5/1991 | Oikawa et al. |
| 5,051,468 A | | 9/1991 | Barnum |
| 5,209,973 A | | 5/1993 | Wille et al. |
| 5,399,366 A | * | 3/1995 | Geddes ............... B32B 27/12 229/87.08 |
| 5,472,485 A | * | 12/1995 | Pandian .............. D21H 17/66 106/203.3 |
| 5,484,509 A | | 1/1996 | Famili et al. |
| 5,853,542 A | | 12/1998 | Bottorff |

(56) References Cited

U.S. PATENT DOCUMENTS

| | | | |
|---|---|---|---|
| 5,854,356 A * | 12/1998 | Bergstrom | C08F 8/42 525/330.3 |
| 5,948,848 A * | 9/1999 | Giltsoff | C08K 5/20 524/227 |
| 6,159,339 A | 12/2000 | Hassler et al. | |
| 6,287,658 B1 * | 9/2001 | Cosentino | C09J 7/22 428/40.1 |
| 6,372,035 B1 | 4/2002 | Juppo et al. | |
| 10,676,592 B2 * | 6/2020 | Dufour | B32B 27/30 |
| 10,781,025 B2 * | 9/2020 | Toubeau | D21H 11/00 |
| 2002/0123624 A1 | 9/2002 | Qiao et al. | |
| 2003/0040568 A1 | 2/2003 | Furuta et al. | |
| 2004/0005341 A1 | 1/2004 | Dixit et al. | |
| 2004/0043166 A1 * | 3/2004 | Gopal | A22C 13/0013 427/230 |
| 2004/0053044 A1 * | 3/2004 | Moreno | C09J 7/38 428/343 |
| 2004/0122151 A1 | 6/2004 | Smith et al. | |
| 2004/0241348 A1 | 12/2004 | Koga et al. | |
| 2004/0241435 A1 | 12/2004 | Grittner et al. | |
| 2005/0170173 A1 | 8/2005 | Coguelin et al. | |
| 2005/0277768 A1 | 12/2005 | Buwalda et al. | |
| 2006/0042767 A1 | 3/2006 | Bhat et al. | |
| 2006/0141246 A1 * | 6/2006 | DiZio | C08F 220/1818 428/343 |
| 2006/0207735 A1 | 9/2006 | Blanz et al. | |
| 2007/0014956 A1 * | 1/2007 | McCarthy | B65H 35/10 428/40.1 |
| 2007/0054068 A1 | 3/2007 | Kimpimäki et al. | |
| 2007/0100306 A1 | 5/2007 | Dizio et al. | |
| 2007/0148377 A1 | 6/2007 | Naito | |
| 2008/0041524 A1 * | 2/2008 | McCarthy | B65H 18/28 156/701 |
| 2008/0233385 A1 | 9/2008 | Ullmann et al. | |
| 2009/0139677 A1 * | 6/2009 | Hamers | D21H 17/17 162/175 |
| 2009/0178773 A1 | 7/2009 | Brockmeyer et al. | |
| 2009/0227718 A1 | 9/2009 | Tanomoto et al. | |
| 2009/0272507 A1 | 11/2009 | Inaoke et al. | |
| 2009/0297842 A1 * | 12/2009 | Akiyama | D21H 19/24 428/341 |
| 2010/0038266 A1 | 2/2010 | Hällström et al. | |
| 2010/0080916 A1 | 4/2010 | Song et al. | |
| 2010/0086709 A1 | 4/2010 | Huang et al. | |
| 2010/0099318 A1 | 4/2010 | Suzuki et al. | |
| 2010/0129642 A1 | 5/2010 | Gröndahl et al. | |
| 2010/0255297 A1 | 10/2010 | Wada et al. | |
| 2010/0304071 A1 | 12/2010 | Murphy et al. | |
| 2010/0305271 A1 | 12/2010 | Mentink et al. | |
| 2010/0310866 A1 | 12/2010 | Yamamoto et al. | |
| 2011/0003097 A1 | 1/2011 | Chen et al. | |
| 2011/0183093 A1 | 7/2011 | Wada et al. | |
| 2012/0135652 A1 | 5/2012 | Dandenault et al. | |
| 2012/0183769 A1 | 7/2012 | Nasu et al. | |
| 2012/0208017 A1 * | 8/2012 | Yoshie | C09J 7/22 428/355 R |
| 2012/0213959 A1 * | 8/2012 | Schuhmann | B32B 27/32 428/447 |
| 2013/0260116 A1 | 10/2013 | Kawashima et al. | |
| 2013/0280545 A1 | 10/2013 | Husband et al. | |
| 2016/0130763 A1 | 5/2016 | Kawagoe et al. | |
| 2016/0348318 A1 | 12/2016 | Koenig et al. | |
| 2017/0002238 A1 * | 1/2017 | Ihrig | C08G 18/4238 |
| 2017/0292043 A1 * | 10/2017 | Dufour | B32B 5/02 |
| 2017/0292044 A1 | 10/2017 | Dufour | |
| 2017/0362478 A1 * | 12/2017 | Blomker | C08G 18/3221 |

FOREIGN PATENT DOCUMENTS

| | | | |
|---|---|---|---|
| EP | 2492327 A1 | | 8/2012 |
| JP | 61268784 A | | 11/1986 |
| JP | 04-220478 A | * | 8/1992 |
| JP | 05-086600 A | * | 4/1993 |
| JP | H08176372 | | 7/1996 |
| JP | H083255518 | | 12/1996 |
| JP | H09029756 A | | 2/1997 |
| JP | H09104851 A | | 4/1997 |
| JP | H09111197 | | 4/1997 |
| JP | H09188858 | | 7/1997 |
| JP | H09194806 A | | 7/1997 |
| JP | H09217041 A | | 8/1997 |
| JP | H09324172 A | | 12/1997 |
| JP | 11028708 | | 2/1999 |
| JP | 11-158452 A | * | 6/1999 |
| JP | 2001172585 A | | 6/2001 |
| JP | 2007204687 A | | 8/2007 |

* cited by examiner

BIODEGRADABLE CELLULOSE FIBER-BASED SUBSTRATE, ITS MANUFACTURING PROCESS, AND USE IN AN ADHESIVE TAPE

CROSS REFERENCE TO RELATED APPLICATIONS

This application is a continuation-in-part of and claims priority to U.S. application Ser. No. 15/514,214, filed Mar. 24, 2017, now U.S. Pat. No. 10,676,592, which was a National Stage Application of PCT/EP2015/072140, filed Sep. 25, 2022, which claimed priority to French Application No. 1459114, filed Sep. 26, 2014, the entirety of which is incorporated by reference herein.

FIELD OF THE INVENTION

The invention relates to a new cellulose fiber-based substrate, as well as a production method thereof.

The invention's field of use is the adhesive tape industry, and to a biodegradable cellulose fiber-based substrate comprising at least a release coating thereon (hereinafter "biodegradable substrate"). According to one particular embodiment, the invention relates to a biodegradable substrate for adhesive tapes, particularly masking tapes used in painting, adhesive tapes, and to methods of manufacturing the same.

DESCRIPTION OF THE PRIOR ART

Adhesive tapes are generally composed of a fibrous substrate, notably crepe paper, to which an adhesive layer is applied on at least one side.

These adhesive tapes have applications in various areas, notably in painting, packaging, insulation, coating, the electronics industry, the automotive and aerospace industry, repairs, etc.

Crepe paper is generally characterized by low basis weight, significant elongation rate, and specific flexibility, porosity, and thickness. These features depend on a number of parameters linked to the papermaking steps, notably the creping step.

In practice, crepe paper has a basis weight of 32 to 80 $g/m^2$, and preferably around 39 $g/m^2$. Crepe paper is elongated by 4 to 20% in the machine's direction or more for certain applications (masking tape for curves).

The production of crepe paper is primarily composed of at least two conventional steps, namely:
the forming of the sheet,
the pressing.

When the creping is made after the pressing, the process is named "wet creping". It is possible not to crepe directly after the pressing. In that case, the step of pressing is followed by a step of drying and the creping is made after. Such a process is named "dry creping".

The invention is concerned by both processes.

The pressing and drying steps may notably be performed on a single drying cylinder (e.g., a Yankee cylinder). When it exits the cylinder, the sheet is creped using special scrapers prior to being wound.

The production of masking tape generally occurs in three steps.

In the first step, a crepe paper, for example, is saturated by being impregnated with a binder or latex, generally an SBR-type of latex (for example, 10 to 20 $g/m^2$ SBR (Styrene-Butadiene Rubber) latex). This first saturation step enables:

improvement of the physical properties of the crepe paper allowing further processing;
the creation of a barrier to prevent the migration of the adhesive into the paper;
good cohesion with the release agent and the adhesive to prevent delamination.

The second step is composed of coating one side of the crepe paper saturated by treatment with a release agent (for example, 4 $g/m^2$ of acrylic latex or silicone).

Lastly, the third step is composed of applying the adhesive onto the second side of the crepe paper (generally between 30 and 40 $g/m^2$) to form the final masking tape. The treatment in the third step allows the tape to be packaged in roll form while facilitating its unwinding by the user.

In practice, the adhesive tape manufacturer obtains crepe paper from the paper manufacturer. The manufacturer saturates the paper and coats it with a release layer on at least one side. It then applies the adhesive layer on the other side to obtain a tape. The whole process therefore requires four distinct steps. Furthermore, the production and subsequent treatment of the paper do not occur on a production line, which obviously affects cost.

In practice, the step of saturating the crepe paper with binders may be incomplete or inhomogeneous when performed outside the production line. With respect to the paint, this results in an imperfectly sealed tape. Masking tapes often pose the problem of minute leakage of paint along the lateral edges of the tape thereby producing a dividing line and imperfect masking.

Further, known adhesive tapes suffer from the drawback of not being biodegradable—and thus are not recyclable or compostable. For example, a number of known adhesive tapes utilize plastic carrier substrates which are not compostable or recyclable at all. As a result, they must be incinerated. For paper-based tapes, the paper carrier substrate is typically impregnated with a synthetic polymer, e.g. acrylic or styrene butadiene latex, and therefore is also not biodegradable. Packaging tapes, in particular, face these same drawbacks.

To overcome all of these drawbacks, the Applicant has developed a new cellulose fiber-based substrate requiring a limited number of production steps and which is also biodegradable. Moreover, the substrate has the advantage of being ready to be coated by the adhesive tape manufacturer with an adhesive.

DISCLOSURE OF THE INVENTION

The object of the invention is a cellulose fiber-based biodegradable substrate, as well as a method of production thereof and its use as a substrate in the production of adhesive tapes, specifically packaging tapes, and to adhesive tapes comprising the biodegradable substrate.

Aspects of the present invention provide biodegradable substrates for tapes to be obtained, which:
notably has at least the same release, dry and wet strength properties as saturated crepe or flat back paper coated on at least one side with a release layer and prepared in the conventional manner,
is prepared continuously on a single production line,
after an adhesive is applied it provides of a tape with peeling properties and a degree of tack that is compliant with manufacturing standards, and
is biodegradable in accordance with EN 13432.

In practice, the invention involves coating at least one side of a base paper with an aqueous composition containing alkyl chains, the said composition acting as both a saturation agent and a release agent.

More specifically, one aspect of the invention is directed to a cellulose fiber-based substrate, at least one side of which is coated with a biodegradable release coating (also "release coating" herein). The release coating comprises an aqueous mixture comprising:
  a) at least one water-soluble polymer (WSP) containing hydroxyl groups,
  b) at least one lactone substituted with at least one linear or branched and/or cyclic $C_8$-$C_{30}$ hydrocarbon chain which may contain heteroatoms,
  c) at least one crosslinking agent.

In an embodiment, the release coating composition is present at 0.1-20 $g/m^2$, and in an embodiment from 0.1-10 $g/m^2$, and in a particular embodiment at 0.1-5.0 $g/m^2$, in the biodegradable substrate.

In an embodiment, the substituted lactone is a diketene molecule.

In an embodiment, the base paper is crepe paper.

In accordance with another aspect, there is disclosed a biodegradable substrate comprising:
  (i) a cellulose fiber-based base paper, and
  (ii) a release coating on at least one surface of the base paper, wherein the release coating comprises, based on dry weight percentage:
    (a) 45-99% of at least one water-soluble polymer (WSP) containing hydroxyl groups, and
    (b) at least one diketene compound, wherein the at least one diketene compound is substituted with at least one linear, branched and/or cyclic C8-C30 hydrocarbon chain which may contain heteroatoms,
  wherein the biodegradable substrate is certified biodegradable in accordance with EN 13432.

In accordance with another aspect, there is disclosed a process for producing a biodegradable substrate comprising:
  (1) forming a release coating comprising, based on dry weight percentage:
    (a) 45-99% of the at least one water-soluble polymer (WSP) containing hydroxyl groups, and
    (b) at least one diketene compound substituted with at least one linear or branched and/or cyclic C8-C30 hydrocarbon chain which may contain heteroatoms,
  (2) coating at least one surface of a cellulose-fiber based base paper with the release coating, and
  (3) drying the release coating on the at least one surface of the base paper to form the biodegradable substrate having the release coating on the least one surface of the base paper;
  wherein the biodegradable substrate is certified biodegradable in accordance with EN 13432.

In accordance with another aspect, there is provided an adhesive tape comprising:
  (i) a cellulose fiber-based paper substrate,
  (ii) a release coating layer on at least one surface of the paper substrate, and
  (iii) an adhesive layer on another surface of the paper substrate opposite to the release coating layer, wherein the release coating layer comprises, based on dry weight percentage:
    (a) 50-99% of at least one water-soluble polymer (WSP) containing hydroxyl groups, and
    (b) at least one diketene compound, wherein the at least one diketene compound is substituted with at least one linear, branched and/or cyclic C8-C30 hydrocarbon chain which may contain heteroatoms.

In an embodiment, the release coating comprises from 50-70 parts by weight of the at least one water-soluble compound to 30-50 parts by weight of the at least one diketene compound.

In view of the above, aspects of the present invention provide for a biodegradable cellulose-fiber based substrate. Biodegradability generally refers to the capability of a material to be converted into water, $CO_2$, and biomass through biological activity of bacteria, fungi, algae, and the like. There is a difference between degradability (mechanical disintegration) and biodegradability (metabolism). Importantly, mechanical disintegration of a material into smaller pieces is not necessarily indicative of biodegradation. Rather, biodegradation refers to the degradation of a material through the action of biological species. Biodegradability is a certified performance characteristic following well-established norms.

Moreover, biodegradability is dependent on chemical composition. The chemical structure of a material (e.g. hydrolysable linkages such as esters, urethanes) is thus important for any enzymatic cleavage of molecules and subsequent mineralization (for example, total conversion into carbon dioxide, water, and biomass) to render the material biodegradable.

The term "biodegradable" as referred to herein is particularly used in accordance with EN 13432, which specifies that a material is considered biodegradable when, within the maximum test period of 180 days, the percentage of biodegradation is at least 90% in total or 90% of the maximum degradation of a suitable reference item after a plateau has been reached for both reference and test item. Materials certified biodegradable according to EN 13432 are generally considered to be well described and sufficient for industrial composting.

As used herein, the term "biodegradable substrate" refers to a cellulose fiber-based base paper coated with a release coating as described herein.

The term "base paper" refers to uncoated paper substrate prior to the application of the release coating.

The base paper for use in the present invention can be any cellulose fiber-based paper.

The term "cellulose fiber-based base paper" refers to a paper comprising cellulose fibers in quantities of at least 50% by weight relative to total weight of fibers.

As used herein, "cellulose fibers" includes cellulose fibers from manmade sources (for example, regenerated cellulose fibers, such as rayon or lyocell fibers) or natural sources, such as cellulose fibers or cellulose pulp from woody and nonwoody plants.

In general, the cellulose fiber-based substrate (also "cellulose substrate"), notably the crepe paper or the flat back paper, is composed of cellulose fibers in proportions ranging from 80 to 99% by weight, based on a total weight of the fibers. Advantageously, the refining of the fibers generally ranges from 20 to 50° SR, preferably from 30 to 40° SR. The cellulose substrate may comprise a crepe paper, a flat back paper, or an extensible paper.

The term "flat back paper" describes a paper backing which is not creped. These papers are quite flat and smooth when compared to typical creped bases. Also, they have very little elongation (2-4%) when compared to creped grades.

Crepe papers are typically used as carrier paper when additional elongation is desired. The mechanical treatment comes from creping or Clupak systems, and avoids the use of additional chemistry to obtain improved elongation.

There are also a range of extensible papers, which provide some elongation and thus improve the properties of the packaging tape to make it more flexible and conformable. Other paper carriers, which are not crepe paper or extensible paper include flat back papers.

The base paper can comprise softwood pulp (e.g. NBSK), hardwood pulp (e.g. eucalyptus), or mixtures of softwood and hardwood pulps. The base paper can comprise short fibers, long fibers, or a mixture thereof.

Natural wood fibers are generally classified into two main categories: hardwood and softwood. Hardwood refers to leaf tree species, and the fibers are considered short fibers (typical length about 0.3-3 mm, preferably 1-2 mm). Softwood refers to conifers, the fibers of which are considered long fibers (typical lengths over 3 mm).

In some embodiments, the substrate comprises softwood and hardwood fibers, the softwood fibers in quantities of at least 50% by weight relative to the total weight of fibers. This is advantageous for the base paper composition particularly for use in masking tape.

In some embodiments, the fibers can be softwood only or hardwood only.

In one embodiment, the substrate comprises softwood pulp containing long fibers, in combination with hardwood pulp containing short fibers. In embodiments comprising a mixture of softwood long fibers and hardwood short fibers, the relative quantities of each can be adjusted to modify mechanical properties of the resulting paper.

In some embodiments, the fibers can comprise non-wood cellulosic fibers, such as various other natural fibers like grass, hemp, or cotton, preferably cotton linters.

In some embodiments, the fibers can comprise manmade cellulosic fibers such as, for example, rayon or lyocell fibers.

In some embodiments, the fibers can comprise other non-cellulosic biodegradable fibers include, for example, biodegradable synthetic fibers. Examples of biodegradable synthetic fibers include, for example, polylactic acid (PLA) fibers, polyhydroxy alkanoate (PHA) fibers, PHB (poly (hydroxybutyrate)), PHB (V) (poly (hydroxybutyrate-co-hydroxyvalerate)), PBS (poly (butylenesuccinate)), biopolyesters, polycaprolactone (PCL) fibers, PBAT fibers, polyglycolic acid (PGA) fibers, derivatives (e.g. co-polymers) and/or blends or mixtures thereof.

Optionally, the base paper can comprise treatment agents or additives including (but not limited to) sizing agents, strength additives, fillers, pigments, wetting agents, antimicrobial agents, antistatic agents, and other desirable materials known in the art. These additional ingredients are selected such that biodegradability of the paper is not compromised. In an embodiment, the biodegradable substrate comprises a maximum of 5% by weight of organic constituents whose biodegradability is not determined.

Packaging tapes must survive impact/absorb energy, so if a packaged material falls or is impacted, the tape does not tear. For this property, a combination of strength and elongation properties is good. Plastic tapes are quite good for elongation, but suffer drawbacks. Paper carriers (base papers) for these tapes generally have much higher basis weights than plastic carriers.

A water-soluble polymer means a polymer which is soluble in water or in an aqueous medium in an uncrosslinked form. Exemplary water soluble polymers are described below.

In an embodiment, the said water-soluble polymer containing hydroxyl groups is selected from the group comprising: polyvinyl alcohol (PVA), starch; oxidized starch, esterified starch, etherified starch, alginate; carboxymethylcellulose (CMC), hydrolyzed or partially hydrolyzed copolymers of vinyl acetate. The hydrolyzed or partially hydrolyzed copolymers of vinyl acetate, for example, can be obtained by the hydrolysis of ethylene-vinyl acetate (EVA), or vinyl chloride-vinyl acetate, N-vinylpyrrolidone-vinyl acetate, and maleic anhydride-vinyl acetate. In another embodiment, the water soluble polymer can be starch or a modified starch. In modified starches (e.g., esterified starch, etherified starch), biodegradability generally decreases with increasing degree of substitution, therefore the degree of substitution (DS) is preferably less than 3. In an embodiment, the water-soluble polymer is a biodegradable water-soluble polymer selected from one or more of the above polymers. In other embodiments, the water-soluble polymer may comprise a derivative of one or more of the above polymers.

In a particular embodiment, the water soluble polymer comprises a hydrolyzed or partially hydrolyzed ethylene-vinyl acetate (EVA) copolymer or a hydrolyzed or partially hydrolyzed vinyl chloride-vinyl acetate copolymer.

By the term "biodegradable polymer" or "biodegradable water soluble polymer (WSP)," it is meant that the polymer may be broken down into organic substances by living organisms, such as by microorganisms. In a particular embodiment, the biodegradable polymer described herein also meets the compostability and biodegrability standards of EN 13432 as does the biodegradable substrate as a whole.

In one embodiment, said water-soluble polymer is PVA, with an advantageous degree of hydrolysis of at least 95% and a molecular weight preferably between 5,000 and 1,000,000 g/mol, advantageously between 10,000 and 150,000 g/mol.

In an embodiment, the diketene molecule, notably when it is substituted by alkyl chains (Alkyl Ketene Dimer or AKD) is a dimerized ketene. Dimerized ketenes are well known in the paper industry, notably for improving hydrophobicity.

AKD is produced from fatty acid chloride. It is typically used in the paper industry in the proportion of 0.15%, or 1.5 kg of AKD per tonne of paper. In this case, it is mixed in emulsion form with the cellulose fibers at the wet end of the paper machine.

AKD's diketene group mixed with the paper fibers particularly reacts with the hydroxyl groups in cellulose. Failing this, it hydrolyzes in the presence of water.

In an embodiment, the diketene molecule may be selected from the group comprising: the diketene molecule with the following structure:

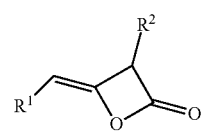

where $R^1$ and $R^2$ are independent linear or branched and/or cyclic $C_8$-$C_{30}$ hydrocarbon chains which may contain heteroatoms.

In particular embodiments, $R^1$ and $R^2$=linear or branched and/or cyclic, saturated and/or unsaturated hydrocarbon chains with 8 to 30 carbon atoms. Examples of linear saturated chains are: octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyle, octacosyl, nonacosyl, triacontyl. Examples of linear unsaturated chains are: octenyl, nonenyl, decenyl, undecenyl, dodecenyl, tridecenyl, tetradecenyl, pentadecenyl, hexadecenyl, heptadecenyl, octadecenyl, nonadecenyl, eicosenyl, heneicosenyl, docosenyl, tricosenyl, tetracosenyl, pentacosenyl, hexacosenyl, heptacosenyl, octacosenyl, nonacosenyl, triacontenyl, etc.

Without wishing to be bound by theory, the immobilization of the diketene within the release coating may also occur when the diketene compound is entrapped within the cage-like structure of a polymer network formed at least in part by the water soluble polymer (WSP).

In certain embodiments, the release coating comprises a cross-linked polymer network. Cross-links are linkages which form to connect together polymer chains at various points in their structure. Thus, polymers which are cross-linked result in a three-dimensional structure of interconnected chains, often referred to as a cross-linked polymer network. In certain embodiments, the release coating comprises a crosslinking agent as described above to enhance crosslinking of the WSP as described herein, however, it is understood that the present invention is not so limited. In some embodiments the WSP can be self-cross-linkable. The self cross-linking may be activated after coating.

In an embodiment, the crosslinking agent is selected so as to not adversely affect or interfere with the biodegradability of the release coating, the biodegradable substrate, and/or the adhesive tape. In an embodiment, the crosslinking agent is selected based on the resulting chemical structure formed upon the cross-linking reaction with hydroxyl groups (e.g. hydroxyl groups of the water-soluble polymer). For example, an aldehyde based cross-linking agent would form ester groups upon a cross-linking reaction with hydroxyl species. In an embodiment, a crosslinking agent may be chosen which forms an ester, amide, urethane, urea, carbamate, carbonate, imide or anhydride functional groups upon cross-linking because these units are amenable to biodegradability via enzymatic cleavage.

In certain embodiments, the release coating comprises a reaction product between the at least one water-soluble polymer (WSP) containing hydroxyl groups and a cross-linking agent. In some embodiments, the reaction may also include at least one diketene compound substituted with at least one linear or branched and/or cyclic C8-C30 hydrocarbon chain which may contain heteroatoms.

The crosslinking agent may comprise any suitable cross-linking agent which promotes crosslinking of the water soluble polymer. In an embodiment, the crosslinking agent comprises glyoxal or a zirconium-based crosslinking agent.

Alternatively, the crosslinking agent can be selected from any agent known for crosslinking of hydroxyl functional groups (e.g. in the water-soluble polymer). For example, the crosslinking agent may comprise a zirconium-based crosslinking agent, such as ammonium zirconium carbonate (AZC) or ammonia-free zirconium oxides. AZC crosslinking agents are known and available commercially, such as Bacote® 20. Ammonia free zirconium oxide crosslinking agents are also available commercially, such as Cartabond® KZI.

In an embodiment, the crosslinking agent used in the composition of the invention is selected from the group comprising: CHO—Y—CHO, where Y=a linear or branched and/or cyclic hydrocarbon chain which may contain heteroatoms: polyaldehydes, polyisocyanates. It may also be the adipic acid/epoxypropyl diethylenetriamine copolymer (CAS No. 25212-19-5).

In a particular embodiment, the crosslinking agent is glyoxal.

In an embodiment, when the crosslinking agent is present, the release coating includes (by dry weight percentage) between 1 and 20% crosslinking agent, and in a particular embodiment, between 3 and 15% relative to a total weight of the release coating.

The document WO2010/141277 also discloses a base paper coated with a water-soluble polymer, in this case PVA. However, prior to coating, the base paper is treated with glyoxal to cross-link and retain the PVA on the substrate. This treatment does not confer release properties to the substrate.

Without wishing to be bound by any theory, the Applicant has noticed that the aliphatic chains, notably the waxes (for example, carnauba wax) can be used as release agents when they coat one side of the substrate. However, due to their low melting point, waxes tend to migrate into the adhesive once in contact therewith, for example, during packaging or when the tape is wound into a roll and stored in roll form. This results in the reduction of the adhesive strength of the tape during its final application to a substrate.

One way of avoiding this phenomenon would be to immobilize the fat or aliphatic chains on the substrate. Thus, without wishing to be bound by any theory, the Applicant found that alkylated diketene in aqueous coating mixture with the water-soluble polymer can react with the latter by forming covalent bonds with the hydroxyl groups. This would immobilize the aliphatic chains carried by diketene on the water-soluble polymer (WSP). The coating mixture allows for the fixation and immobilization of the WSP polymer, having reacted with diketene, on a base paper.

According to one particular embodiment of the invention, the composition used for treating at least one side of the base paper is composed of:

PVA, advantageously 95% hydrolyzed, as the water-soluble polymer,
a molecule of diketene with the following structure:

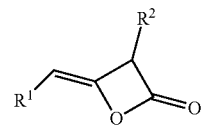

with $R^1$ selected from the group composed of tetradecyl ($C_{14}$), hexadecyl ($C_{16}$), and octadecyl ($C_{18}$),
and $R^2$ selected from the group composed of tetradecyl ($C_{14}$), hexadecyl ($C_{16}$) and octadecyl ($C_{18}$),
and optionally a crosslinking agent, e.g., glyoxal or a zirconium-based crosslinking agent.

According to one embodiment, the composition used by dry weight percentage is composed of:
between 50 and 99% water-soluble polymer (WSP), advantageously between 60 and 90%,
between 1 and 50% diketene, advantageously between 10 and 40%, and
between 1 and 20% crosslinking agent, advantageously between 3 and 15%.

According to another embodiment, the release coating comprises, based on dry weight percentage:
45 to 99% water-soluble polymer (WSP), in an embodiment 50 to 90%, and in a particular embodiment 55 to 75%,
1 to 55% of the at least one diketene compound, in an embodiment 10 to 40%, and in a particular embodiment 20-35%.

In an embodiment, the release coating comprises, based on dry weight percentage:
a) 50-90% of the water soluble polymer (WSP); and
b) 10-40% of the at least one diketene compound.

In an embodiment, the release coating comprises from 50-70 parts by weight of the at least one water-soluble compound to 30-50 parts by weight of the at least one diketene compound.

In an embodiment, the release coating is formed from an aqueous mixture comprising the components described herein (at least one WSP, at least one diketene compound, and optionally a crosslinking agent).

In certain embodiments, the release coating further comprises a crosslinking agent, and in an embodiment, 1-20% of the crosslinking agent by dry weight percentage of the release coating, and in a particular embodiment 3-15%.

The cellulose fiber-based substrate is coated on at least one side with a release coating according to the invention. Advantageously, the dry weight of the composition is 0.1 to 20 g/m$^2$, in an embodiment between 0.1 to 10 g/m$^2$ and in another embodiment 1 to 18 g/m$^2$.

In an embodiment, the release coating comprises 0.1 to 40% by weight of the biodegradable substrate, and in a particular embodiment 1 to 25 wt %.

In an embodiment also, the release coating may comprise 0.1-67 parts by weight of the release coating per 100 parts by weight of the base paper, and in a particular embodiment 1-34 parts per 100 parts base paper.

In an embodiment, the release coating has a basis weight of between 3 and 10 g/m$^2$ on the biodegradable substrate.

Suitable base papers of this invention have a grammage between 30 and 100 g/m$^2$. In some embodiments, the base paper can be a crepe paper with a basis weight of 32-80 g/m$^2$, such as approximately 39 g/m$^2$.

The substrate typically has a basis weight of about 30-170 g/m$^2$, more typically 30.1 to 140 g/m$^2$.

The substrate typically has elongation in the machine direction of 1% to 25%, preferably 2% to 20%. In an embodiment, the elongation of base paper is 4 to 20% in the machine direction, or more for certain applications (masking tape for curves). The elongation of substrates suitable for packaging tapes is advantageously 1% to 25% in the machine direction, or preferably from 2% to 18%.

In an embodiment, the fibers and coating are selected such that the biodegradable substrate meets a minimum desirable MD tensile strength and elongation to prevent tearing of the substrate during use, such as when manufactured into an adhesive tape.

This elongation rate or elongation capacity is particularly advantageous for the application of crepe paper as a masking tape for painting. A good elongation rate allows for better handling and shaping of the tape.

Dry tensile strength of the substrate is typically at least 30 N/cm in the machine direction.

The thickness of the coated substrate varies with grammage (i.e. basis weight) and specific end-use. In some embodiments, the measured value of Thickness (under pressure, 1 bar) is from 30 to 200 μm, preferably from 50 to 170 μm.

The porosity of the biodegradable substrate is also highly variable depending upon basis weight and thickness and composition. In some embodiments, the substrate can have Bendsten porosity of less than 4000 ml/min at 1.47 kPa. In some embodiments, the substrate can have Textest air permeability of less than about 50 l/m$^2$/s at 200 Pa, preferably about 25 l/m$^2$/s or less. The Cobb (60 s) value of the biodegradable substrate is typically less than 20 g/m$^2$.

Another purpose of the invention is a method of producing a biodegradable substrate according to the invention. The method comprises:
1) preparing an aqueous release coating by mixing:
   at least one water-soluble polymer with hydroxyl groups,
   at least one lactone substituted with at least one linear or branched and/or cyclic $C_8$-$C_{30}$ hydrocarbon chain which may contain heteroatoms, and
   optionally at least one crosslinking agent.
   2) coating at least one side of a cellulose fiber-based base paper with the release coating, and
   3) drying the base paper with said release coating to form the biodegradable substrate.

In an embodiment, the method comprises forming the cellulose fiber-based substrate.

In accordance with an aspect of the present invention, the process may further comprise applying an adhesive layer onto a second surface of the base paper opposite a first surface coated with the release coating and optionally drying the base paper with the applied adhesive.

Thus, aspects of the present invention are directed to adhesive tapes having a biodegradable cellulose fiber-based substrate comprising the release coating as described herein on one surface thereof and an adhesive on an opposed surface, including masking tapes used in painting.

The release coating or adhesive composition can be applied by any method known in the art, for example by conventional coating or lamination methods.

Coating techniques known by a person skilled in the art further include, among others, the size press, the metering-size press, immersion coating, bar coating, Champion powder coating, air knife coating, scraping knife coating, knife over roll coating, single-layer and multilayer curtain coating, transfer roll coating (reverse roll coating), spray coating, atomized coating, LAS (Liquid Application System) coating, kiss coating, foam coating and any surface treatment method using coating.

In an embodiment, the production of a biodegradable substrate according to the invention takes place on a single production line where base paper is prepared from a pulp of cellulose fibers, creped, and then coated with a release coating composition in accordance with the present invention. Downstream of the paper machine, the coated crepe paper (biodegradable substrate) is ready to be coated with adhesive, preferably on the side opposite to that treated with the composition of the invention, to form adhesive tapes, for example, masking tapes.

Another purpose of the invention is a masking tape composed of a biodegradable substrate as described herein. In an embodiment, the side not treated with the release composition is coated with an adhesive.

In an embodiment, the adhesive comprises a biodegradable adhesive as is known in the art. See e.g., GB 2451883A, U.S. Pat. No. 5,580,940, EP2647682B1, and JP2007070422A1.

GB2451883A describes adhesive compositions which are fully biodegradable in accordance with EN 13432. A range of biodegradable and compostable adhesives are disclosed therein, comprising copolymers of polyester or acrylic copolymerized with a range of aldo-pentoses and polyhydric alcohols. The adhesive compositions comprise a reactive copolymer of a vinyl monomer and a sugar-based macromer, for example an alkyl polyglycoside maleic acid ester. U.S. Pat. No. 5,580,940 also describes biodegradable adhesives based on a polymer formed from monomers comprising range of diacrylates, having mono- or di-saccharide moieties.

The adhesive may also comprise a pressure sensitive adhesive (PSAs). PSAs are common in adhesive tapes, and biodegradable adhesives of the PSA variety are also known. For example, EP2647682B1 describes biodegradable PSAs based on polylactic acid. JP2007070422A1 also describes biodegradable PSAs based on a polyester polyurethane. The adhesive composition can be in the form of, for example, an aqueous suspension, dispersion, emulsion, or solution. In addition, the adhesive may be applied by any suitable process known by a person of skill in the art. In an embodiment, the adhesive is applied by for example, coating, size press, dry deposition, hot-melt-application, or laminating an adhesive layer. Adhesive compositions for used herein may further comprise additional components, such as rheology modifiers, tackifiers, crosslinking agents, co-solvents, surfactants, and the like.

In an embodiment, the adhesive is present in the adhesive tape at 20 to 40 g/m$^2$ The invention also relates to the use of the substrate disclosed above in the production of masking tape.

The invention also relates to the use of the substrate disclosed above in the production of packaging tape.

The invention and advantages thereof will become more apparent from the following non-limiting examples given to describe the invention.

EMBODIMENTS OF THE INVENTION

Figure 1:
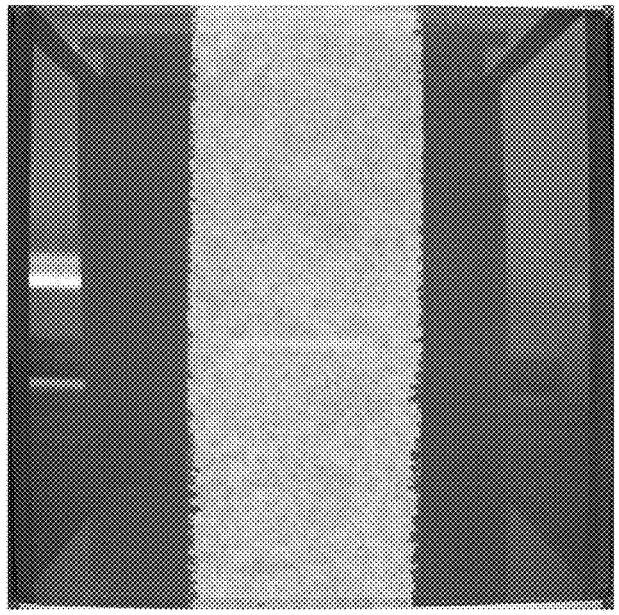
FIG. 1 illustrates a paint test to see the resistance of masking tape against paint for a 1$^{st}$ sample.

I/1$^{st}$ Embodiment: Crepe Paper as a Substrate

1: Comparative Test

A sheet of crepe paper for masking tape (Master Tape™ Classic 100) with a basis weight of 39 g/m$^2$ was treated on one side by being coated with an aqueous mixture with a dry weight of 5 g/m$^2$ obtained according to the invention.

The composition by dry weight was composed of:
46% dry Celvol® 28/99 (or 46% starch Perfectamyl® A4692),
46% dry AKD (Aquapel® J215 by Ashland)
8% Glyoxal (TSI Cartabond® by Clariant).

The resulting coated substrate had a basis weight of 44 g/m$^2$. This coated substrate was compared with crepe paper of the same type (100/39 g/m$^2$ Master Tape™ Classic) treated with an SBR-type of latex (XZ 97235.00 by Styron) and with a 4 g/m$^2$ acrylic release agent (Primal® R-550 by Dow).

The following comparative table summarizes the mechanical properties that were measured under dry and wet conditions and shows the results:

TABLE 1

| Comparative test | | |
|---|---|---|
| | 39 g/m$^2$ Master tape 100 + 5 g/m$^2$ PVA + AKD + Glyoxal | 39 g/m$^2$ Master tape 100 + 10 g/m$^2$ SBR-type latex + 4 g/m$^2$ acrylic release agent |
| Basis weight (g/m$^2$) | 44 | 53 |
| dry MD tensile strength (kN/m) - elongation (%) | 2.37-11.6 | 2.72-13 |
| dry CD tensile strength (kN/m) | 1.23 | 1.22 |
| wet MD tensile strength (kN/m) | 1.2 | 1.32 |
| wet CD tensile strength (kN/m) | 0.59 | 0.5 |
| 60 sec Cobb (g/m$^2$) | 13 | 12 |
| Peel strength (N/5 cm) | 5.8 | 7.6 |

2: Release Test

A sheet of 60 g/m$^2$ crepe paper was coated with various aqueous compositions using size press treatment. The dry deposition of these compositions was between 6 and 7 g/m$^2$.

The aqueous compositions included:
PVA (Moviol® 4/98) (or starch Perfectamyl® A4692),
AKD (Aquapel® J215 by Ashland)
Glyoxal (CAS No. 107-22-2) (Cartabond® TSI by Clariant)
Water.

The FINAT F™ 1 test was applied. This test assesses the adaptation of a release substrate to rolling by using a PSA-type adhesive.

Sample 1: A piece of a commercial masking tape (COTEKA® of Bricomarché, 5 cm width) was applied onto the release face of another piece of COTEKA® tape using a 10 kg roller. The peel strengths were measured at a speed of 300 mm/min and an angle of 180°.

PVA/AKD—70/30 sample: A piece of commercial masking tape (COTEKA® by Bricomarché, 5 cm width) was applied using a 10 kg roller on the side of a piece of crepe paper coated with the composition of the invention composed of 70 parts PVA to 30 parts AKD (or 64.4% PVA, 27.6% AKD, and 8% glyoxal by weight).

PVA/AKD—60/40 sample: A piece of commercial masking tape (COTEKA® by Bricomarché, 5 cm width) was applied using a 10 kg roller on the side of a piece of crepe paper coated with the composition of the invention composed of 60 parts PVA to 40 parts AKD (or 55.2% PVA, 36.8% AKD, and 8% glyoxal by weight).

PVA/AKD—50/50 sample: A piece of commercial masking tape (COTEKA® by Bricomarché, 5 cm width) was applied using a 10 kg roller on the side of a piece of crepe paper coated with the composition of the invention composed of 50 parts PVA to 50 parts AKD (or 46% PVA, 46% AKD and 8% glyoxal, by weight).

TABLE 2

| Release test: Peel Strengths per FINIAT FTM 1 | |
|---|---|
| | Peel strength (N/5 cm) |
| Sample 1 (COTEKA ®) | 7.24 |
| PVA/AKD - 70/30 sample | 8.26 |
| PVA/AKD - 60/40 sample | 7.08 |
| PVA/AKD - 50/50 sample | 5.87 |

It was noted that the peel strengths of the invention were on par with those of the commercial product, between 5 to 8 N/5 cm, and they varied according to the amount of AKD introduced into the mixture. The greater the amount of AKD in the mixture, the lower the peel strength. This shows the release property of the alkyl chains present within the AKD.

3: FINAT F™ 11 Test—Subsequent Adhesion

The "subsequent adhesion release" is the force required at a given speed and angle to tear a tape coated with an adhesive adhered to a standard test plate, this tape having previously been in contact with the side of a substrate of the same type coated with a release agent under specific temperature and humidity conditions.

The aim of this test is to measure the possible transfer of the release agent into the adhesive layer.

The percentage of subsequent adhesion is expressed as the ratio between the measured adhesion compared with the adhesion obtained by a similar control tape which was not in contact with a substrate coated with a release agent. The adhesion value of the control tape was measured at 10.97 N/5 cm.

TABLE 3

FINAT FTM 11 test - subsequent adhesion

|  | Adhesion strength (N/5 cm) | % Loss/Gain |
|---|---|---|
| Sample 1 (COTEKA ®) | 10.52 | −4.1% |
| PVA/AKD - 70/30 sample | 10.43 | −4.9% |
| PVA/AKD - 60/40 sample | 10.45 | −4.7% |
| PVA/AKD - 50/50 sample | 9.91 | −9.6% |

The amount of loss of adhesion strength of substrates related to the invention was similar to the commercial product. There is therefore little or no transfer of AKD into the adhesive.

4: Peel Strength After Pressure Aging Test (70 g/cm$^2$) at Room Temperature in Accordance with the FINAT FM 10 Test A commercial masking tape (COTEKA® by Bricomarché, 5 cm width) was applied on the different biodegradable substrates and on COTEKA® tapes using a 10 kg roller under the same conditions as Example 2. The samples were pressurized (70 g/cm$^2$) at room temperature (23° C. and 50% humidity) for 20 hours. They were then kept for at least 4 hours at 23° C. and 50% relative humidity. The peel strengths were measured at a speed of 300 mm/min and an angle of 180°—FINAT FM1 test.

TABLE 4

Peel strength after pressure aging test (70 g/cm$^2$) at room temperature in accordance with the FINAT FM 10 test

|  | Peel strength (N/5 cm) | | | | % Loss/ |
|---|---|---|---|---|---|
| Sample | 1 | 2 | 3 | Average | Gain |
| Sample 1 (COTEKA ®) | 7.12 | 7.23 | 6.88 | 7.08 | −2.26 |
| PVA/AKD - 70/30 sample | 7.57 | 7.31 | 7.56 | 7.48 | −9.41 |
| PVA/AKD - 60/40 sample | 7.67 | 6.78 | 6.72 | 7.06 | −0.28 |
| PVA/AKD - 50/50 sample | 5.63 | 5.63 | 5.88 | 5.71 | −2.61 |

The values were compared with the values of Example 2 (Peel strength before the aging test). It was noted that the change in strength of both the commercial product and the coated substrate was low (loss between 2 and 9%) and therefore the peel strengths were stable over time under pressure at room temperature.

5: FINAT F™ 11 Test—Subsequent Adhesion After Aging at Room Temperature

"Subsequent adhesion release" is the force at a given speed and angle required to tear a tape coated with an adhesive adhered to a standard test plate, this tape having previously been in contact with the side of a substrate of the same type coated with a release agent under specific temperature and humidity conditions.

The percentage of subsequent adhesion is expressed as the ratio between the adhesion measured compared to the adhesion obtained by a similar control tape which was not in contact with a substrate coated with a release agent. The adhesion value of the control tape was measured at 10.97 N/5 cm.

TABLE 5

FINAT FTM 11 test - subsequent adhesion after aging at room temperature

|  | Adhesion strength (N/5 cm) | % Loss/Gain |
|---|---|---|
| Sample 1 (COTEKA ®) | 10.02 | −8.6 |
| PVA/AKD - 70/30 sample | 10.41 | −5.1 |
| PVA/AKD - 60/40 sample | 9.84 | −10.3 |
| PVA/AKD - 50/50 sample | 9.41 | −14.22 |

The amount of loss of adhesion strength of coated substrates related to the invention was similar to the commercial product. There is therefore little or no transfer of AKD into the adhesive. The prototype with 50 parts of AKD shows a lower value, involving a slight potential migration of AKD into the adhesive.

6: Peel Strength After Pressure Aging Test (70 g/cm$^2$) at 70° C. in Accordance with the FINAT FM 10 Test A commercial masking tape (COTEKA® by Bricomarché, 5 cm width) was applied on the different types of crepe paper and COTEKA® tapes using a 10 kg roller under the same conditions as Example 2. The samples were pressurized (70 g/cm$^2$) at 70° C. for 20 hours. They were then kept for at least 4 hours at 23° C. and 50% relative humidity. The peel strengths were measured at a speed of 300 mm/min and an angle of 180°—FINAT FM1 test.

TABLE 6

Peel strength after pressure aging test (70 g/cm$^2$) at 70° C. in accordance with the FINAT FM 10 test

|  | Peel strength (N/5 cm) | % Loss/Gain |
|---|---|---|
| Sample 1 (COTEKA ®) | 8.26 | 14.09 |
| PVA/AKD - 70/30 sample | 9.89 | 19.78 |
| PVA/AKD - 60/40 sample | 10.68 | 50.92 |
| PVA/AKD - 50/50 sample | 9.11 | 55.28 |

The change in the peel strengths of the biodegradable substrates in accordance with the invention with 30 parts of AKD shows a change in its release properties similar to the commercial product (15-20%). In contrast, the other two biodegradable substrates samples in accordance with the invention show quite a significant change (+50%).

7: FINAT F™ 11 Test—Subsequent Adhesion After Aging at 70° C.

The "subsequent adhesion release" is the force required at a given speed and angle to tear a tape coated with an adhesive adhered to a standard test plate, this tape having previously been in contact with the side of a substrate of the same type coated with a release agent under specific temperature and humidity conditions.

The percentage of subsequent adhesion is expressed as the ratio between the measured adhesion compared to the adhesion obtained by a similar control tape which was not in contact with a substrate coated with a release agent. The adhesion value of the control tape was measured at 10.97 N/5 cm.

TABLE 7

FINAT FTM 11 test - subsequent adhesion after aging at 70° C.

|  | Adhesion strength (N/5 cm) | % Loss/Gain |
|---|---|---|
| Sample 1 (COTEKA ®) | 9.76 | −11 |
| PVA/AKD - 70/30 sample | 10.01 | −8.7 |
| PVA/AKD - 60/40 sample | 9.21 | −16 |
| PVA/AKD - 50/50 sample | 7.43 | −32.2 |

The amount of loss of adhesion strength in biodegradable substrates with 30 parts of AKD was similar to the commercial product. There is therefore little or no transfer of AKD into the adhesive for this prototype. In contrast, the prototype with 50 parts of AKD shows a much lower value (loss of adhesion strength of more than 30%) involving a potential migration of AKD into the adhesive.

8: Peel Strength after Aging (7 Days) at High Temperature (65° C.) and High Humidity (85% Relative Humidity)—AFERA #4003 (EN 12024) Test A commercial masking tape (COTEKA® by Bricomarché, 5 cm width) was applied to the different biodegradable substrates in accordance with the invention and to itself using a 10 kg roller. The samples were then kept as such (without pressure) in a climate simulation chamber at 65° C. and 85% humidity for 7 days (AFERA # 4003 test). The peel strengths were measured at a speed of 300 mm/min and an angle of 180°.

TABLE 8

Peel strength after aging (7 days) at high temperature (65° C.) and high humidity (85% relative humidity) - AFERA #4003 (EN 12024) test

| Sample | Initial peel strength (N/5 cm) | Peel strength after aging (N/5 cm) | % change |
|---|---|---|---|
| Sample 1 (COTEKA ®) | 7.24 | 9.99 | +38% |
| PVA/AKD - 70/30 sample | 8.26 | 9.95 | +20% |
| PVA/AKD - 60/40 sample | 7.08 | 9.37 | +32% |
| PVA/AKD - 50/50 sample | 5.87 | 8.34 | +42% |

It may therefore be noted that the different biodegradable substrates in accordance with the present invention perform similarly or better (more stable peel strength for the PVA/AKD—70/30 mixture) than the commercial product (i.e.: COTEKA®).

II/2$^d$ Embodiment: Flat Back Paper as a Substrate

Release Test

A sheet of 62 g/m² flat back paper was coated with various aqueous compositions using size press treatment. The dry deposition of these compositions was 8 g/m².

The aqueous compositions included:
PVA (Moviol® 4/98) (or starch Perfectamyl® A4692),
AKD (Aquapel® J215 by Ashland)
Glyoxal (CAS No. 107-22-2) (Cartabond® TSI by Clariant)
Water.

The FINAT F™ 1 test was applied. This test assesses the adaptation of a biodegradable substrate to rolling by using a PSA-type adhesive.

Sample 1: A piece of a commercial masking tape (COTEKA® of Bricomarché, 5 cm width) was applied onto the release face of another piece of COTEKA® tape using a 10 kg roller. The peel strengths were measured at a speed of 300 mm/min and an angle of 180°.

PVA/AKD—70/30 sample: A piece of commercial masking tape (COTEKA® by Bricomarché, 5 cm width) was applied using a 10 kg roller on the side of a piece of a flat back paper (AHLSTROM Mastertape™ DELICATE 400-62 g/m²) coated with 8 g/m² of the composition of the invention composed of 70 parts PVA to 30 parts AKD (or 64.4% PVA, 27.6% AKD, and 8% glyoxal by weight).

Starch/AKD—70/30 sample: A piece of commercial masking tape (COTEKA® by Bricomarché, 5 cm width) was applied using a 10 kg roller on the side of a piece of a flat back paper ((AHLSTROM Mastertape™ DELICATE 400-62 g/m²) coated with 8 g/m² of the composition of the invention composed of 70 parts Starch to 30 parts AKD (or 64.4% starch, 27.6% AKD, and 8% glyoxal by weight).

TABLE 9

Release test Peel Strengths per FINIAT FTM1

|  | Peel strength (N/5 cm) |
|---|---|
| Sample 1 (COTEKA ®) | 7.24 |
| PVA/AKD - 70/30 sample | 6.89 |
| Starch/AKD - 70/30 sample | 5.956 |

It was noted that the peel strengths of the invention were on par with those of the commercial product, between 5 to 8 N/5 cm. This shows the release property of the alkyl chains present in AKD.

III/Paint Test

The aim of paint test is to see the resistance of masking tape against paint. Especially, the migration of the paint on the edges (paint back) is observed. This test has been developed by the Applicant.

1/Preparation of the Sample

Sample 1: A commercial masking tape (COTEKA® by Bricomarché, 5 cm width).

Sample 2: A sheet of crepe paper for masking tape (Mastertape™ Smart line 300) with a basis weight of 55 g/m² was treated by size press at machine scale with an aqueous mixture PVA/AKD (50/50 in parts or 46% PVA, 46% AKD and 8% glyoxal by weight), with a dry weight of 5 g/m².

Sample 3: A sheet of flat back paper ((AHLSTROM Mastertape™ DELICATE 400-62 g/m²)) with a basis weight of 62 g/m² was treated by size press at lab scale with an aqueous mixture PVA/AKD (70/30 in parts or 64.4% PVA, 27.6% AKD and 8% glyoxal by weight), with a dry weight of 8 g/m2.

Sample 2 and 3 are then coated on the smoother side with 25 to 30 g/m² of an adhesive (DowCorning Binder ROBOND PS9005 (MS: 57%)).

2/Application of the Paint

Sample 1 and samples 2 and 3 (these later being cut in band of 5 cm width) are applied each on a 13 cm by 13 cm transparent glass plate. 3.5 to 3.7 g of paint is applied on all the surface of the plate.

The plates are left to dry at least 4 hours.

3/Measurement of the Migration of the Paint

Each plate is turned and a transparent mesh having holes of 1 mm is applied against the plate. Surface of migration is then calculated by counting the number of holes filed with the paint/cm. lower is the surface of paint, lower is the migration and better is the marking tape.

4/Results

FIG. 1: Sample 1 corresponds to COTEKA. The migration is 10.6 mm²/cm.

Figure 2:
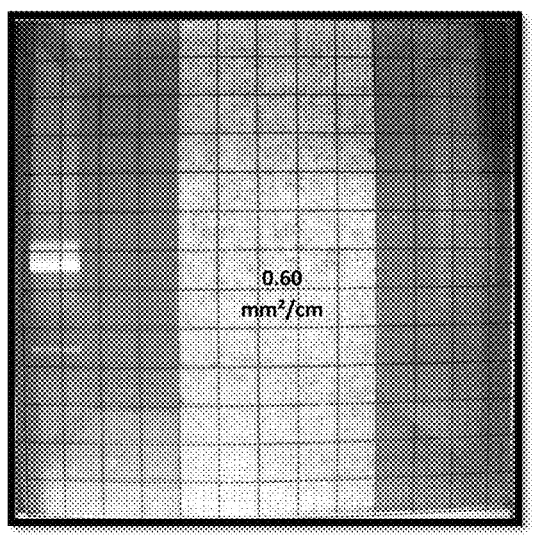
FIG. 2: illustrates a paint test to see the resistance of masking tape against paint for a 2$^{d}$ sample.

FIG. 2: sample 2 of the invention. The migration is 0.6 mm²/cm.

Figure 3:
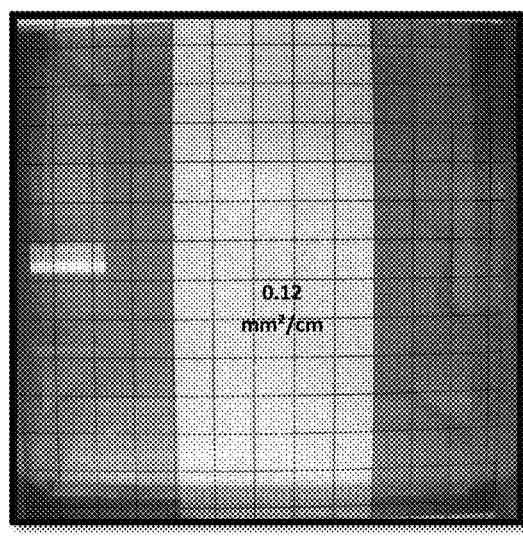
FIG. 3 illustrates a paint test to see the resistance of masking tape against paint for a 3$^{d}$ sample.

FIG. 3: sample 3 of the invention. The migration is 0.12 mm²/cm.

IV/Biodegradability Test

To evaluate biodegradability of coated biodegradable substrates in accordance with the present invention, two samples were prepared.

1/Sample Preparation and Characterization

Inventive example 1 (EX1), Inventive example 2 (EX2): The base paper used in EX1 and EX2 is cellulose fiber-based. In particular, the base paper comprises a mixture of Joutseno pulp from Metsä Fibre (i.e. a Northern Bleached Softwood Kraft (NBSK) pulp having long fibers), and a eucalyptus (EUC) pulp from Suzano (i.e., a bleached EUC hardwood pulp having short fibers).

TABLE 10

Biodegradability test: Base Paper characterization

| | EX1 | EX2 |
|---|---|---|
| Composition | 75% Joutseno NBSK pulp 25% Suzano EUC pulp | 60% Joutseno NBSK pulp 40% Suzano EUC pulp |
| basis weight, gsm | 49 g/m2 | 44 g/m2 |
| Creping configuration | flat paper | delicate configuration flat paper |

The base papers were treated on one side with the Release Composition using size-press.

TABLE 11

Biodegradability test: Substrate characterization

| | EX1 | EX2 |
|---|---|---|
| Release composition. | 65.4% Starch 28% AKD (Aquapel J215) 6.5% Glyoxal (Cartabond TSI) | |
| Dry weight ratio Starch:AKD | 70:30 | |
| Dry weight ratio crosslinker:starch | 1:10 | |
| Thickness under pressure (ISO 534, 1 bar) | 76 μm | 75 μm |
| Bulk or density | 1.55 | 1.71 |
| Coat weight, gsm | 6-8 g/m2 | 4-5 g/m2 |
| dry MD tensile strength (kN/m) | 3.9 | 5.15 |
| dry CD tensile strength (kN/m) | 2.23 | 2.02 |
| wet MD tensile strength (kN/m) | 0.83 | 1.51 |
| wet CD tensile strength (kN/m) | 0.47 | 0.68 |
| Dry MD elongation (%) | 2% | 2.48% |
| Dry CD elongation (%) | 4.761% | 5.373% |
| Wet MD elongation (%) | 3.92% | 4.697% |
| Wet CD elongation (%) | 5.707% | 7.261% |
| Bendsten porosity 1.47 kPa (ml/min) | 5.1 | 29 |
| 60 sec Cobb value, gsm | 15 gsm | 14.03 gsm |

Peel strength values of the biodegradable substrates are suitably <20N/5 cm, preferably <10N/5 cm, and most preferably in the range of 5-8N/5 cm by following the FINIAT F™1 test protocol as outlined in Example 2: release test. It is appreciated that different reference tapes, peel angles, peel speeds, and the like may affect the peel strength values.

2/Biodegradability Tests

The inventive specimens EX1 and EX2 were evaluated for biodegradability.

The aerobic biodegradation of EX1 and EX2 was evaluated by controlled composting test according to ISO 14855-1 (2012). Incubation temperature was kept at 58° C. and the test duration was 45 days. The controlled composting biodegradation test is an optimized simulation of an intensive aerobic composting process where the biodegradability of a test item under dry, aerobic conditions is determined.

The test is performed using a test sample and a suitable reference item. In the test procedure, the test item is mixed with inoculum (stabilized and mature compost derived from the organic solid waste), and introduced into static reactor vessels where it is intensively composted under optimum oxygen, temperature and moisture conditions. Through biodegradation, solid carbon of the test compound is converted and $CO_2$ is produced. Each individual reactor is continuously analyzed on regular intervals for $CO_2$ and $O_2$ concentration and flow rate. Using these measurements, rate of $CO_2$ production and cumulative total $CO_2$ production can be determined.

The percentage of biodegradation is determined as the percentage of solid carbon of the test compound that is converted to gaseous, mineral carbon under the form of $CO_2$. For the reference item and the test items, the absolute biodegradation percentage is determined based on carbon measured from $CO_2$ production as a percentage of total carbon in the item ($CO_2$ quantified with mass).

The test is considered valid if after 45 days the biodegradation percentage of the reference item is more than 70% and if the standard deviation of the biodegradation percentage of the reference item is less than 20% at the end of the test. Both criteria were met successfully.

Results

TABLE 12

| | Biodegradation at 10 and 45 days | | |
|---|---|---|---|
| | Reference item (cellulose) | EX1 | EX2 |
| Biodegradation at 10 days | 56.8% | Approx. 60% | |
| Biodegradation at 45 days (end of test) | 74.8% ± 3.7% | 71.6% ± 4.7% | 77.1% ± 2.6% |

In addition to absolute biodegradation percentage, relative biodegradation percentage of the test items can be determined on a relative basis with respect to the reference item. Biodegradation relative to reference item was 95.7% and 103.1% for EX1 and EX2, respectively.

European standard EN 13432 (2000) specifies that a biodegradable material, within the maximum test period of 180 days, the percentage of biodegradation is at least 90% in total or 90% of the maximum degradation of a suitable reference item after a plateau has been reached for both reference and test item.

Test samples EX1 and EX2 fulfill the biodegradation requirement of EN 13432 within 45 days of testing, thus it can be concluded that the test samples are biodegradable according to European standard EN 13432 (2000). As mentioned, the biodegradation levels of EX1 and EX2 relative to reference cellulose determined per ISO 14855-1 (2012) were 95.7% and 103.1% for EX1 and EX2, respectively, at 45 days duration.

The invention claimed is:

1. An adhesive tape comprising:
   (i) a cellulose fiber-based paper substrate,
   (ii) a release coating layer on at least one surface of the paper substrate, and
   (iii) an adhesive layer on another surface of the paper substrate opposite to the release coating layer, wherein the release coating layer comprises, based on dry weight percentage:
      (a) 50-99% of at least one water-soluble polymer (WSP) containing hydroxyl groups, and
      (b) 1-50% of at least one diketene compound, wherein the at least one diketene compound is substituted with at least one linear, branched and/or cyclic C8-C30 hydrocarbon chain which may contain heteroatoms,
   wherein the at least one diketene compound is immobilized on the WSP and the WSP is immobilized on the at least one surface of the paper substrate.

2. The adhesive tape of claim 1, wherein the release coating comprises from 50-70 parts by weight of the at least one water-soluble polymer to 30-50 parts by weight of the at least one diketene compound.

3. The adhesive tape of claim 1, wherein the at least one water-soluble polymer comprises polyvinyl alcohol or starch, and wherein the at least one diketene compound comprises alkyl ketene dimer.

4. The adhesive tape of claim 1, wherein the release coating comprises a cross-linked polymer network.

5. The adhesive tape of claim 1, wherein the at least one water-soluble polymer comprises a polyvinyl alcohol, a starch, an oxidized starch, an esterified starch or an etherified starch.

6. The adhesive tape of claim 1, wherein the release coating layer comprises, based on dry weight percentage:
   (a) 50-90% of the at least one water-soluble polymer (WSP),
   (b) 10-40% of the at least one diketene compound.

7. The adhesive tape of claim 1, wherein the cellulose fiber-based paper substrate comprises crepe paper.

8. The adhesive tape of claim 1, wherein the at least one water-soluble polymer (WSP) containing hydroxyl groups is selected from the group consisting of polyvinyl alcohol (PVA); starch; oxidized starch; esterified starch; etherified starch; alginate; carboxymethylcellulose (CMC); and hydrolyzed or partially hydrolyzed copolymers of vinyl acetate, ethylene-vinyl acetate copolymers, vinyl chloride-vinyl acetate copolymers, N-vinylpyrrolidone-vinyl acetate copolymers, or maleic anhydride-vinyl acetate copolymers.

9. The adhesive tape of claim 1, wherein the at least one diketene compound comprises a diketene molecule of the following structure:

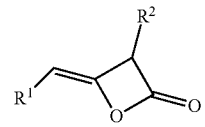

wherein R1 and R2 are independent linear or branched and/or cyclic C8- C30 hydrocarbon chains which may contain heteroatoms.

10. The adhesive tape of claim 1, wherein
   (a) the at least one water-soluble polymer (WSP) is polyvinyl alcohol (PVA), and
   (b) the at least one diketene compound is at least one alkylated diketene compound having the following structure:

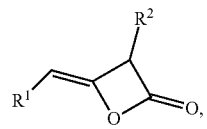

wherein
R1 is selected from the group consisting of tetradecyl (C14), hexadecyl (C16) and octadecyl (C18), and R2 is selected from the group consisting of tetradecyl (C14), hexadecyl (C16) and octadecyl (C18).

11. The adhesive tape of claim 1, wherein the release coating layer is present in an amount from 1 to 20 g/m², based on a dry weight of the release coating layer.

* * * * *